United States Patent
Liu et al.

(10) Patent No.: US 7,809,866 B2
(45) Date of Patent: Oct. 5, 2010

(54) DOUBLE INTERFACE SD FLASH MEMORY CARD

(75) Inventors: Wen-Tsung Liu, Taipei Hsien (TW); Chia-Li Chen, Taipei Hsien (TW)

(73) Assignee: Carry Computer Engineering Company, Limited, Hsin Tien (TW)

( * ) Notice: Subject to any disclaimer, the term of this patent is extended or adjusted under 35 U.S.C. 154(b) by 0 days.

(21) Appl. No.: 10/216,611

(22) Filed: Aug. 12, 2002

(65) Prior Publication Data

US 2004/0059846 A1  Mar. 25, 2004

(51) Int. Cl.
*G06F 13/12* (2006.01)
*G06F 3/00* (2006.01)

(52) U.S. Cl. .................... 710/62; 710/2; 710/8; 710/72

(58) Field of Classification Search ................... 710/72, 710/2, 74, 8, 62
See application file for complete search history.

(56) References Cited

U.S. PATENT DOCUMENTS

| | | | | |
|---|---|---|---|---|
| 6,385,677 | B1 * | 5/2002 | Yao ............................. | 711/115 |
| 6,394,817 | B1 * | 5/2002 | Kihira et al. ............... | 439/76.1 |
| 6,438,638 | B1 * | 8/2002 | Jones et al. ................. | 710/301 |
| 6,658,516 | B2 * | 12/2003 | Yao ............................. | 710/301 |
| 2003/0100203 | A1 * | 5/2003 | Yen ............................. | 439/79 |

OTHER PUBLICATIONS

Universal Serial Bus Specification 2.0, p. 87.*
SimpleTech, http://www.simpletech.com/flash/secure_digital.php. *

* cited by examiner

*Primary Examiner*—Alan Chen

(57) ABSTRACT

A double interface SD flash memory card includes a SD flash memory card and a USB adaptor. The SD flash memory card has a standard SD card interface and a circuit board, which has a microprocessor and flash memories. The USB adapter has at least a SD interface socket and a USB plug. The SD interface socket can be inserted with a SD flash memory card and the USB plug can be connected to other information devices. The double interface SD flash memory card includes a SD bus interface circuit for the SD flash card, a USB bus interface circuit for a system end, and an interface detection and switching circuit detect if there is an initialized signal from the system interface and switch to the SD bus interface circuit or the USB bus interface circuit based on result of the detection. The microprocessor can detect, identify, and support connecting signal of SD interface or USB interface automatically. When a signal is sent from the SD card interface or the USB card interface, the microprocessor will switch the circuit and relevant electronic elements in the circuit board to support the SD card or the USB card to access the data in the flash memories in the card.

20 Claims, 4 Drawing Sheets

DOUBLE INTERFACE SD FLASH MEMORY CARD

BACKGROUND OF THE INVENTION

1. Field of the Invention

The present invention is related to a double interface flash memory card, in particular to a double interface SD flash memory card.

2. Description of Related Art

Since the USB (Universal Serial Bus) interface was developed in 1996, it has gradually taken over the position of various conventional transmission interfaces due to its high transmission rate, easy installation, hot-swapping and plug & play features. With a USB interface, the host can be connected to various peripheral equipments, such as scanner, keyboard, printer, etc., without the need of installing drivers. Thus products with USB interfaces are widely used not only in computers (e.g., desktops or notebooks) or peripheral equipment but also in various IA products (e.g., PDA, DSC, MP3 Player, etc.).

In year 2,000, Matsushita, SanDisk, and Toshiba introduced a new "SD Flash Memory Card" standard, which is referred as "Secure Digital Card". A SD Card comprises of several flash memories, a microprocessor, and a semiconductor circuit. Due to its lightweight, small size, high access speed, and large capacity, the SD card is widely used in peripheral equipment, PDAs, DSCs, MP3 Players, etc., and has become a new portable storage media that has vast market value. The SD card adopts a dedicated SD interface. Though manufacturers of peripheral equipment or information appliances can develop products dedicated used with SD flash memory cards, these products can't meet the requirements of customers to exchange data between them and computer systems (desktops or notebooks) or other digital products communicating with USB interfaces. For example, if a consumer wants to access the data in a DSC with the SD flash memory card and display or edit the data in a computer system or a product with a USB interface, this work can't be done because that there is no corresponding SD interface at the computer system or the digital product described above.

In such cases, the consumers have to buy a flash memory card driver (card reader) or an Adaptor that supports SD cards to exchange data with the computer systems or digital products with USB interfaces. Or they may buy a card having the same transfer interface as that of the computer system as the intermediate media to access the data in the SD card. Both of the two approaches add the cost of the product and the complexity of operation, bringing inconvenience to the interoperability between SD cards and products with USB interfaces.

SUMMARY OF THE INVENTION

In consideration of above problems, the inventor invents a "Double Interface SD Flash Memory Card", which can eliminate the shortcomings in legacy SD cards.

The Double Interface SD Flash Memory Card eliminates the intermediate device or Adaptor, which decreases the cost of manufacturing and the complexity in application.

Another purpose of this invention is to provide a flash memory product that can access computers or products with USB interfaces through a cheap USB Adaptor with the detection, control, and switching actions of its microprocessor. The invention is similar to the Removable Hard Disk product in structure. However, besides supporting SD flash memory cards, this invention can also support USB interface. In other words, the microprocessor of this invention integrates the functionalities of the control chip on a legacy Adaptor to facilitate storage, transfer, and exchange of digital data between the invention and computer systems/IA products at lowest cost and through the simplest approach.

A further purpose of this invention is to significantly decrease the cost of the system (eliminating the additional Adaptor device) while enhance the convenience of application (installation, operation, etc.) of this product. With the dedicated SD interface and the new Adaptor integrated, the device can detect/identify the circuit of the system interface, and then switches the device to the right system interface. It not only support USB interface, but also support SD interface.

BRIEF DESCRIPTION OF THE DRAWINGS

The present invention can be more fully understood by reference to the following description and accompanying drawings, in which.

DETAILED DESCRIPTION OF THE PREFERRED EMBODIMENT

Figure 1:
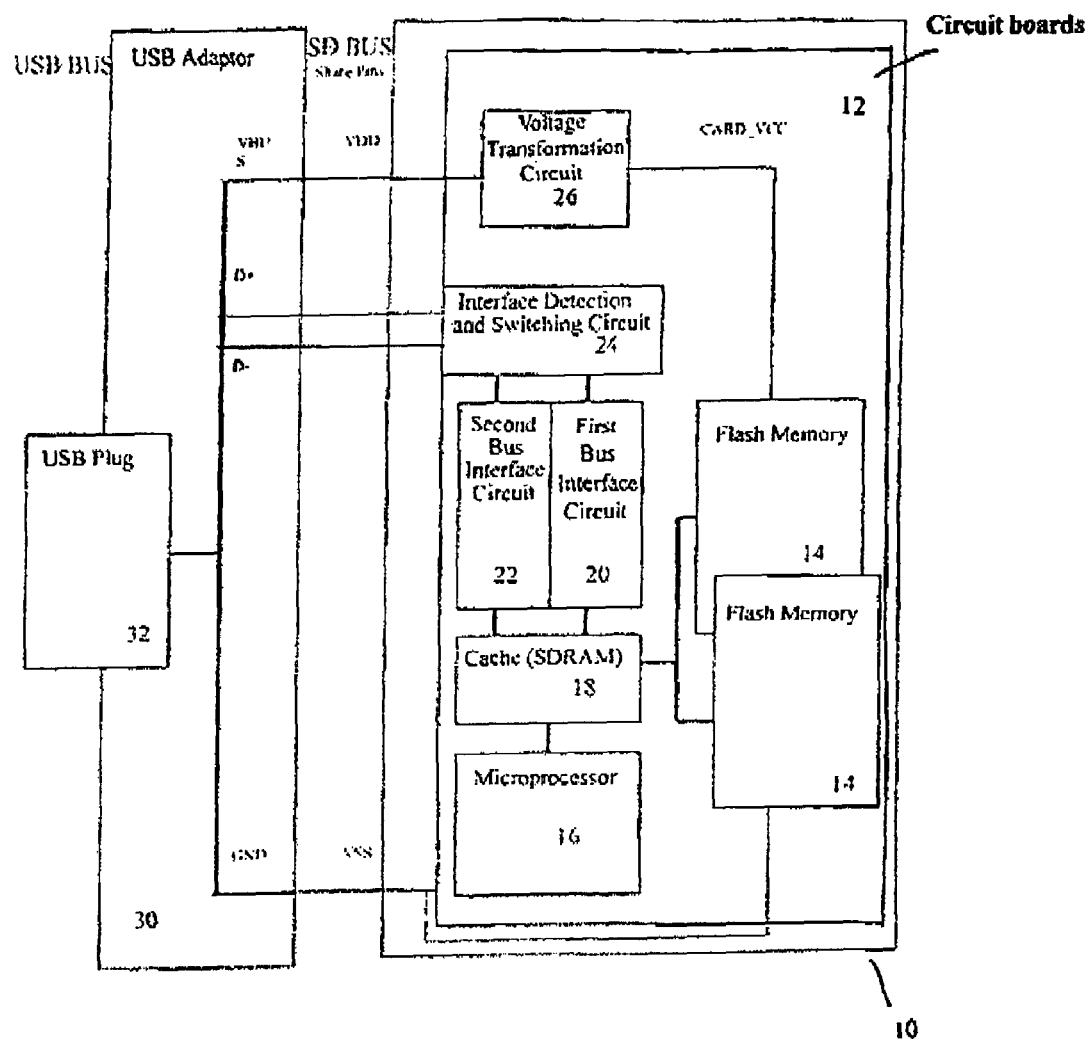
FIG. 1 is a block diagram of the control circuit of the double interface SD flash memory card according to the present invention.

Referring to FIG. 1, a block diagram of the control circuit of double interface SD flash memory card of this invention. The double interface SD flash memory card integrates a USB interface, which is popular in the market, to communicate with computers or other digital products with USB interface. As shown in FIG. 1, the double interface SD flash memory card has a standard transfer interface (first interface, 9 I/O pins) and a corresponding circuit board (12), which has a microprocessor (16) and multi flash memory chips (14), circuit board (12) has at least a bus interface circuit (first interface circuit 20), a cache (SDRAM 18), and a power transfer circuit (26), as well as an access interface and a Flash (not shown). The USB adaptor (30) has at least a flash memory interface socket (not shown) and a transmission interface (second interface), which is a USB plug (32). Apparently, this flash memory interface serves as an interface of the double interface SD flash memory Card (10). And the double interface SD flash memory card (10) can be connected to computer systems or other digital products with USB interface through the second transmission interface (USB Plug 32) of the USB adaptor. The unique feature of this invention lies in that:

- an interface bus circuit (second bus interface circuit) (22) embedded in the microprocessor (16);
- a interface detection and switching circuit (24) embedded in the microprocessor (16) to detect and switch to the first bus interface circuit (20) or the second bus interface circuit (22).

The microprocessor (16) can automatically detect, identify, and support signals from the SD interface or the USB plug (32). When a signal at the SD interface or the USB plug (32) occurs, the microprocessor (16) will switch the circuit and relevant elements in the circuit board (12) to support the data transmission form the SD interface or the USB plug (32) to the flash memory chips (14).

The preceding first bus interface circuit 20 in the preferred embodiment is a SD bus interface circuit used for the SD flash memory card and the second bus interface circuit 22 is a USB bus interface circuit used for a system end. Both the bus interface circuits 20, carry out data transmission with the USB adapter 30 or a system interface circuit 34 suitable for the SD flash memory card via being electrically connected to the interface detection and switching circuit 24. The interface detection and switching circuit 24 is used for detecting if there is an initialized signal generated by a system interface circuit of the SD flash memory card and switching to the first (SD) bus interface circuit 20 or the second (USB) bus interface circuit 22 based on if the signal is detected.

It should be emphasized that the microprocessor (16) of double interface SD flash memory card (10) not only can identify and control the SD interface, but also support products with USB Interface under the help of the USB adaptor (30). Thus, the invention serves as a portable storage media supporting SD and USB interfaces.

Figure 2:
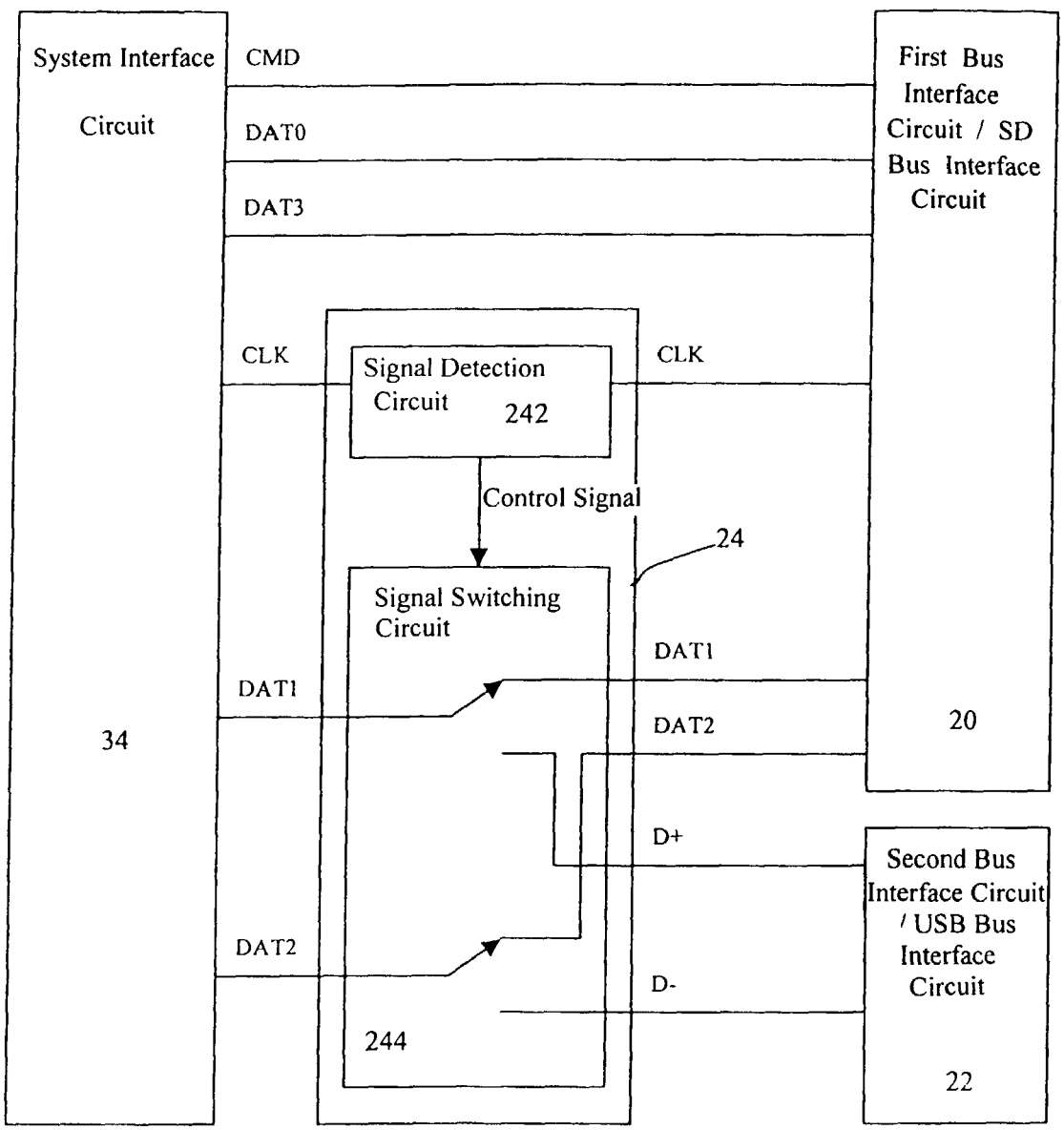
FIG. 2 is a block diagram of the arbitration circuit for detection, control, and switching of the double interface SD flash memory card of the present invention.

Referring to FIG. 2, the block diagram of the arbitration circuit of the invention to perform identification, control, and switching functions. There are two system interface circuits (34) in the double interface SD flash memory card (10), i.e., the card (10) integrates functions that must be implemented with a card reader and the control chip of an adaptor. The figure shows six different signal terminals (CLK, CMD, DAT0, DAT1, DAT2, DAT3). The DAT1 and DAT2 are used for connecting and switching to the D+ and D− signals of the USB system interface circuit (34), i.e. the two and DAT2 are used as common terminals D+ and D− steals of the USB plug and the CLK is used as the signal for detection of the system interface circuit (34), i.e., it serves as the basis to select the First Bus interface circuit (20) or the Second Bus Interface Circuit/USB Bus Interface Circuit (22).

According to the specification for SD flash memory cards, when the card is powered on, if the system interface of the SD flash memory card (34) detects an initialization signal (74 pulses/s), the SD Bus Interface circuit (20) will trigger the CLK signal to indicate that the SD Bus Interface circuit (20) is currently selected. On the contrary, if no such an initialization is detected by the system interface (34), the signal detection circuit (242) will output a control signal to the signal switching circuit (244) to switch the DAT1 and DAT2 terminals to the USB Bus Interface Circuit (22). In this way, on the basis of the signal from the interface detection and switching circuit (24), the invention will determine which system interface circuit (34) should be switched to. In order to support different system interface circuits (34) at the same time, the microprocessor (16) of this invention integrates the processes to support both system interface circuits (34), and support both system interface circuits (34) to generate corresponding instructions and communication protocols.

Figure 3:
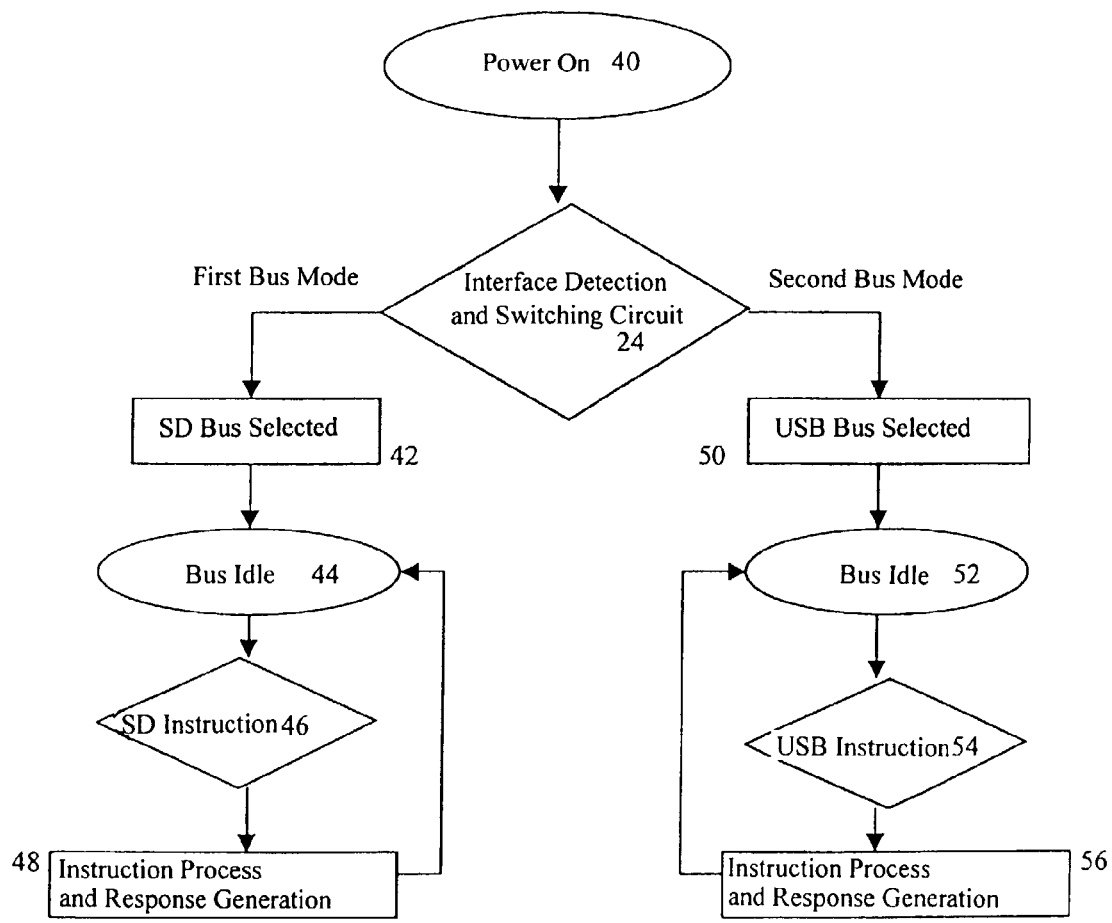
FIG. 3 is a preferred flowchart of the detection, control, and switching procedure according to this invention.

Please see FIG. 3, a flow chart of a preferred circuit detection and switching process of this invention. From the figure we can see that when the power supply module (40) provides power to the Double Interface SD Flash Memory Card (10), the microprocessor (16) will switch to the correct working mode and initialize the appropriate system interface circuit (34) in according to the interface circuit detected by the interface detection and switching circuit (24). Then, the microprocessor (16) will receive the instruction and perform necessary process and generates appropriate response in accordance with the specification for the system interface circuit (34) currently selected. For example, if the system interface circuit (34) detected by the interface detection and switching circuit (24) is the First Bus Mode (i.e., SD Bus Mode), the process will enters into the working cycle for SD interface, i.e., selects SD Bus (42), generates a SD instruction (46) after the Bus Idle (44) signal is detected, and performs necessary process and generates appropriate response (48), and finally returns to Bus Idle (44) mode. On the contrary, if the system interface circuit detected by the interface detection and switching circuit (24) is the Second Bus Mode (i.e., USB Bus Mode), the process will enters into the working cycle for USB interface, i.e., selects USB Bus (50), generates a USB instruction (54) after the Bus Idle (52) signal is detected, and performs necessary process and generates appropriate response (56), and finally returns to Bus Idle (52) mode.

Figure 4:
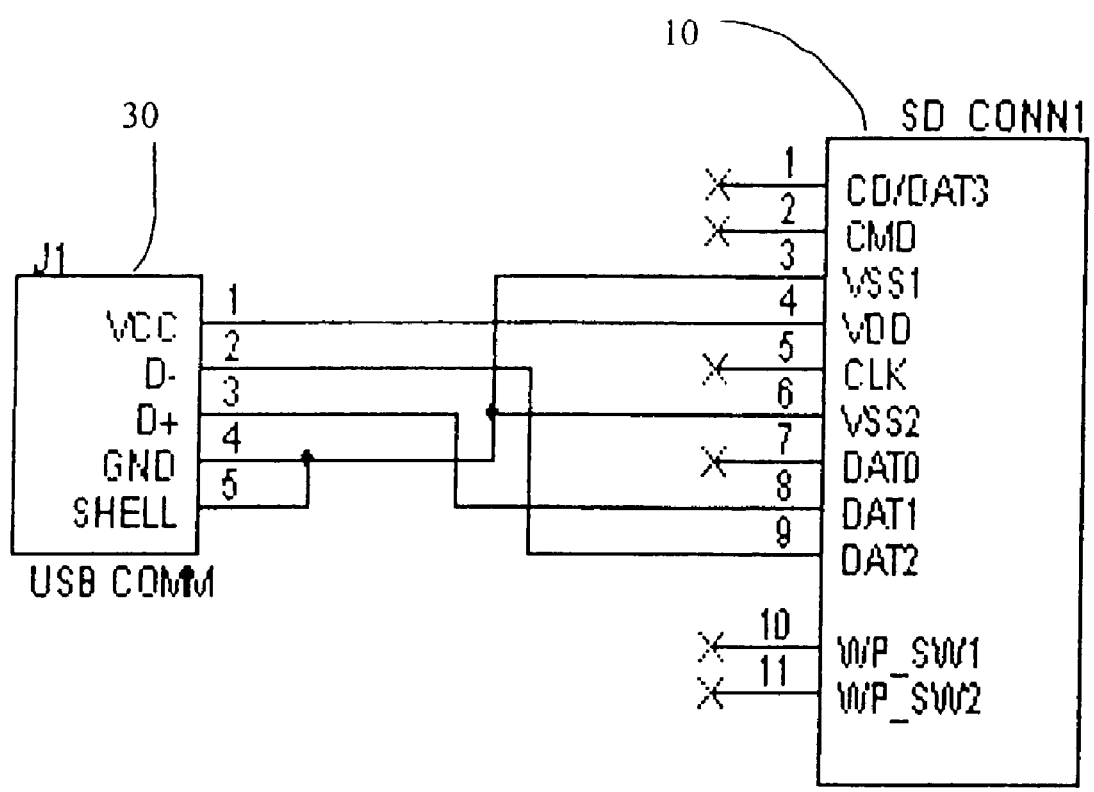
FIG. 4 is a circuit diagram of a USB adaptor in the double interface SD flash memory card of the present invention.

When the system interface (34) is set, it can't be altered afterwards. If it has to be altered, it should be entirely removed, and then the power should be switched off. Finally, the other system interface circuit can be selected. Please see FIG. 4, a wiring chart of the USB Adaptor in the Double Interface SD Flash Memory Card. This figure is a sketch map of the connection between the Double Interface SD Flash Memory Card and a cheap USB adaptor (30). In conclusion, the double interface SD flash memory Card of this invention has the following advantages:

1. This invention substitutes the relatively expensive auxiliary card reader or Adaptor device with a much cheaper adaptor, and implements the data transfer or exchange with various digital products. It decreases the cost of manufacturing and the complexity in application.
2. This invention can provide a flash memory product that can access computers or products with USB interfaces through a cheap USB adaptor with the detection, control, and switching functions of its microprocessor. Besides supporting SD flash memory cards, this invention can also support USB interface. In other words, the microprocessor of this invention integrates the functionalities of the control chip on a conventional adaptor to facilitate storage, transfer, and exchange of digital data between the invention and computer systems/IA products at lowest cost and through the simplest approach.
3. This invention can significantly decrease the cost of the system (eliminating the additional adaptor device) while enhances the convenience of application (installation, operation, etc.) of this product. With the dedicated SD interface and the new adaptor integrated, the device can detect/identify the circuit of the system interface, and then switches the device to the right system interface. It not only support USB interface, which is popular in computer systems and other digital products, but also serves as a portable flash memory card integrating SD and USB interfaces.

While the invention has been described with reference to the a preferred embodiment thereof, it is to be understood that modifications or variations may be easily made without departing from the spirit of this invention, which is defined by the appended claims.

The invention claimed is:

1. A double interface flash memory card, which has a first transmission interface and a circuit board with a microprocessor and a plurality of flash memory thereon, comprising:
    a first bus interface circuit especially for a system interface circuit of the flash memory card being able to perform signal transmission;
    a second bus interface circuit for the other information apparatuses, which are different from the flash memory card, being able to perform signal transmission; and
    an interface detection and switching circuit, electrically connecting with the first transmission interface, the first bus interface circuit and the second bus interface circuit for detecting if there is an initializing signal generated from the system interface circuit and switching to the first bus interface circuit or the second bus interface circuit according to the initializing signal being generated or not generated;

wherein, the microprocessor switches the status thereof to a working mode and a suitable system interface circuit mode is started according to what type of the system interface circuit being detected by the interface detection and switching circuit so that the microprocessor can detect, determine and support a connection action signal automatically; when either the first transmission interface or the second transmission interface offers the action signal at the transmission end thereof and, in the mean time, the microprocessor switches the circuit and the related electronic elements on the circuit board to support data transmission action of the first transmission interface or the second transmission interface in the flash memories.

2. The double interface flash memory card as defined in claim 1, further comprises a double interface SD flash memory card and, in other words, the first transmission interface is a standard transmission interface of the SD interface flash memory card.

3. The double interface flash memory card as defined in claim 1, wherein the microprocessor further has a built-in cache unit and a power transfer circuit and the cache unit is electrically connected to the first bus interface circuit, the second bus interface circuit, the microprocessor and the flash memories.

4. The double interface flash memory card as defined in claim 1, wherein the first bus interface circuit comprises a standard SD bus interface circuit.

5. The double interface flash memory card as defined in claim 1, wherein the second bus interface circuit comprises a USB bus interface circuit.

6. The double interface flash memory card as defined in claim 1 is connected to a adapter, which has an interface socket for being inserted with said first interface and a second transmission interface for being used with other information apparatuses.

7. The double interface flash memory card as defined in claim 6, wherein the second transmission interface comprises a USB plug.

8. A double interface SD flash memory card combination, comprising:
a double interface SD flash memory card; and
a USB adapter;
wherein the double interface SD flash memory card further comprises:
a first transmission interface; and
a circuit board, providing a microprocessor and a plurality of flash memories, the microprocessor having at least a built-in first bus interface circuit; and the USB adaptor having at least a SD interface socket for being inserted with the double interface SD flash memory card and has a second transmission interface for being used with other information apparatus;
wherein the first bus interface circuit is built in the double interface SD flash memory card especially for a system interface circuit of the flash memory card being able to perform signal transmission; a second bus interface circuit is built in the double interface SD flash memory card for the other information apparatuses, which are different from the flash memory card, being able to perform signal transmission; and an interface detection and switching circuit is built in the double interface SD flash memory card for detecting if there is an initializing signal generated from the system interface circuit and switching to the first bus interface circuit or the second bus interface circuit according to the initializing signal being generated or not;

whereby, the microprocessor can detect, determine and support a connection action signal automatically; when either the first transmission interface or the second transmission interface offers the action signal at the transmission end thereof and, in the mean time, the microprocessor switches the circuit and the related electronic elements on the circuit board to support data transmission action of the first transmission interface or the second transmission interface in the flash memories.

9. The double interface SD flash memory card combination as defined in claim 8, wherein the microprocessor further has a built-in cache unit and a power transfer circuit and the cache unit is electrically connected to the first bus interface circuit, the second bus interface circuit, the microprocessor and the flash memories.

10. The double interface SD flash memory card combination as defined in claim 8, wherein the first transmission interface comprises a standard transmission interface of the SD interface flash memory card.

11. The double interface SD flash memory card combination as defined in claim 8, wherein the second transmission interface comprises a USB plug.

12. The double interface SD flash memory card combination as defined in claim 8, wherein the first bus interface circuit comprises a standard SD bus interface circuit.

13. The double interface SD flash memory card combination as defined in claim 8, wherein the second bus interface circuit comprises a USB bus interface circuit.

14. A double interface flash memory card, which has a first transmission interface and a circuit board with microprocessor and a plurality of flash memories, at least comprises:
a first bus interface circuit especially for a system interface circuit of the flash memory card being able to perform signal transmission;
a second bus interface circuit for the other information apparatuses, which are different from the flash memory card, being able to perform signal transmission;
a plurality of common pins, being formed as common connecting ends for signal transmission between the double interface flash memory card and a system interface circuit and the information apparatuses; and
an interface detection and switching circuit, electrically connecting with the first transmission interface, the first bus interface circuit and the second bus interface circuit for detecting if there is an initializing signal generated from the system interface circuit and switching the common pins to the first bus interface circuit or the second bus interface circuit according to the initializing signal being generated or not generated;
wherein, the microprocessor switches the status thereof to a working mode and a suitable system interface circuit mode is started according to what type of the system interface circuit being detected by the interface detection and switching circuit.

15. The double interface flash memory card as defined in claim 14, further comprises a double interface SD flash memory card and the first transmission interface is a standard transmission interface of the SD interface flash memory card.

16. The double interface flash memory card as defined in claim 14, wherein the microprocessor further has a built-in cache unit and a power transfer circuit and the cache unit is electrically connected to the first bus interface circuit, the second bus interface circuit, the microprocessor and the flash memories.

17. The double interface flash memory card as defined in claim 14, wherein the first bus interface circuit comprises a standard SD bus interface circuit.

18. The double interface flash memory card as defined in claim 14 is connected to a adapter, which has an interface socket for being inserted with said first interface and a second transmission interface for being used with other information apparatuses.

19. The double interface flash memory card as defined in claim 14, wherein the second transmission interface comprises a USB plug.

20. The double interface flash memory card as defined in claim 14, wherein the second bus interface circuit comprises a USB bus interface circuit.

* * * * *